United States Patent
Artis et al.

(10) Patent No.: US 7,289,077 B2
(45) Date of Patent: Oct. 30, 2007

(54) FREQUENCY-DISPERSIVE ANTENNA APPLIED IN PARTICULAR TO A METEOROLOGICAL RADAR

(75) Inventors: Jean-Paul Artis, Plouzane (FR);
 Gérard Debionne, Mery sur Oise (FR);
 Georges Guillaumot, Tigery (FR);
 Maxence Marcant, Milizac (FR)

(73) Assignee: Thales, Neuilly-sur Seine (FR)

( * ) Notice: Subject to any disclaimer, the term of this patent is extended or adjusted under 35 U.S.C. 154(b) by 0 days.

(21) Appl. No.: 11/445,462

(22) Filed: Jun. 2, 2006

(65) Prior Publication Data

US 2007/0069967 A1   Mar. 29, 2007

(30) Foreign Application Priority Data

Jun. 3, 2005   (FR) .................................. 05 05646

(51) Int. Cl.
 *H01Q 13/10* (2006.01)
(52) U.S. Cl. ..................... 343/771; 343/770; 333/114
(58) Field of Classification Search ............... 343/771, 343/770, 768; 333/114
See application file for complete search history.

(56) References Cited

U.S. PATENT DOCUMENTS

| 5,079,561 A | * | 1/1992 | Park | 343/771 |
| 5,210,543 A | * | 5/1993 | Kurtz | 343/771 |
| 5,650,793 A | * | 7/1997 | Park | 343/771 |

* cited by examiner

*Primary Examiner*—Hoang V. Nguyen
(74) *Attorney, Agent, or Firm*—Lowe Hauptman Ham & Berner, LLP

(57) ABSTRACT

The invention relates to a frequency-dispersive antenna. The antenna comprises radiating waveguides on which are formed slots. The antenna comprises at least one feed waveguide linked by coupling slots to the radiating waveguides. The variation of the pointing direction of the beam from the antenna in at least one plane is obtained by varying the frequency of the wave guided by the feed waveguide. The length of the feed waveguide between the coupling slots of two adjacent radiating waveguides is greater than the distance separating the coupling slots of these two adjacent radiating waveguides.

Figure 1:
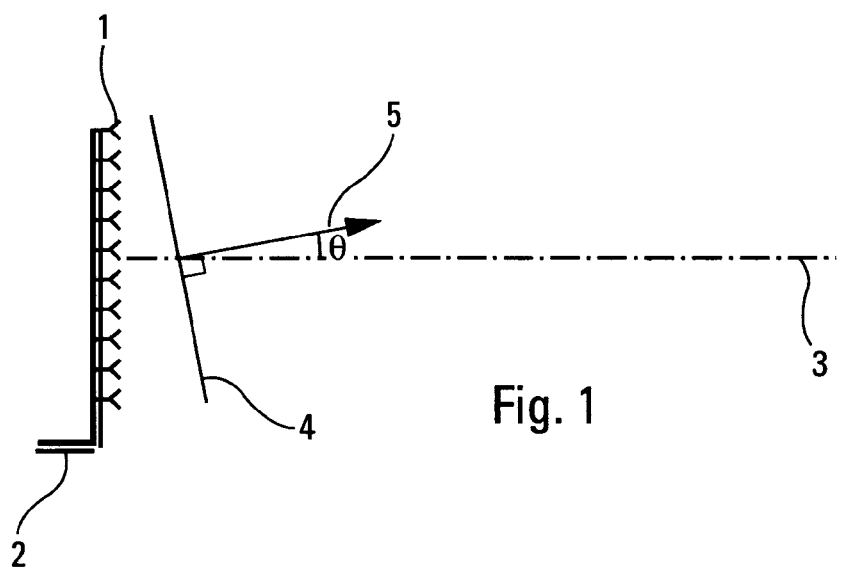

In particular, the invention applies to an airborne antenna suited to the detection and locating of meteorological phenomena.

7 Claims, 4 Drawing Sheets

FREQUENCY-DISPERSIVE ANTENNA APPLIED IN PARTICULAR TO A METEOROLOGICAL RADAR

The invention relates to a frequency-dispersive antenna. In particular, the invention applies to an airborne antenna suited to the detection and locating of meteorological phenomena.

Most airborne meteorological radars comprise an antenna for which the bearing- and elevation-mode sweep is controlled mechanically. The inertia of the antenna and the required degree of agility of the beam influence the choice of the motors included in the sweep mechanisms. Because of their complexity, such mechanisms can be particularly expensive.

In order to produce a less expensive antenna, it may particularly be appropriate to use an electronic sweep, at least in elevation mode, instead of the conventional sweep mechanisms. In practice, to analyse the short and long range meteorological field requires only a few degrees of sweep in elevation, typically plus or minus 3 degrees. In the case where the bearing-mode sweep is provided by a conventional mechanism over plus or minus 90 degrees, for example, a single bearing-mode sweep is required to analyse all the meteorological field. The performance stresses on the motors performing the sweep are considerably reduced without, however, degrading the sweep performance levels of the antenna.

Conventional solutions based on microwave phase shifters implemented in an electronic sweep antenna are ill-suited to the design of an inexpensive antenna. In practice, in order to obtain a receive pattern in which the secondary and diffused lobes of the signal received by the antenna are at least 30 dB less than the radiation maximum, the number of phase shifters required becomes prohibitive in terms of cost. Furthermore, the electrical consumption of an antenna including microwave phase shifters is high, which complicates integration in an aircraft where the electrical and temperature conditioning resources are limited.

Furthermore, the reliability of such an electronic sweep antenna is particularly sensitive to the failure rates of its controllable microwave phase shifters. With the predictive computation of the reliability of the antenna being difficult since the rejection of the secondary and diffused lobes is degraded in particular according to the number of failing phase shifters and the position of the latter, it is difficult to guarantee a level of service.

The main aim of the invention is to overcome the above-mentioned drawbacks. In particular, but not exclusively, the object of the invention is to allow for an inexpensive antenna for meteorological radar. To this end, the subject of the invention is an antenna comprising radiating waveguides on which are formed slots. The antenna comprises at least one feed waveguide linked by coupling slots to the radiating waveguides. The variation of the pointing direction of the beam from the antenna in at least one plane is obtained by varying the frequency of the wave guided by the feed waveguide. The length of the feed waveguide between the coupling slots of two adjacent radiating waveguides is greater than the distance separating the coupling slots of these two adjacent radiating waveguides.

According to another aspect of the invention, the feed waveguide is positioned roughly in the plane perpendicular to the radiating waveguides.

Advantageously, the feed waveguide is in the form of a coil.

According to yet another aspect of the invention, the feed waveguide operates in progressive mode.

According to yet another aspect of the invention, the radiating waveguides operate in resonant mode.

Advantageously, the radiating waveguide includes a coupling slot not parallel to the length of the side in which the coupling slot is formed.

The invention can in particular be used in a radar suited to the detection and locating of meteorological phenomena.

The main advantages of the invention are that the structure of the secondary lobes of the pattern of an antenna according to the invention is not affected by varying the pointing of the beam from the antenna regardless of the frequency of the microwave signal sent in the operating waveband, that it provides for a particularly compact implementation and that it is simple to produce.

Figure 2A:
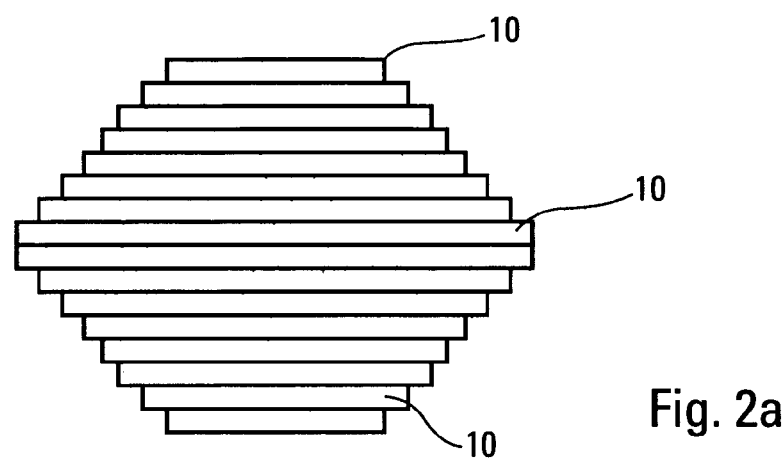
Figure 2B:
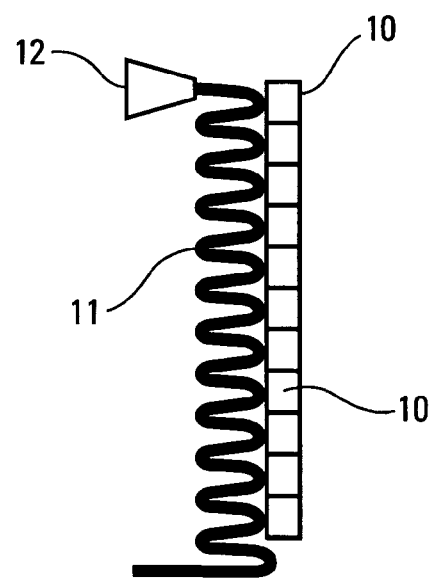
Figure 2C:
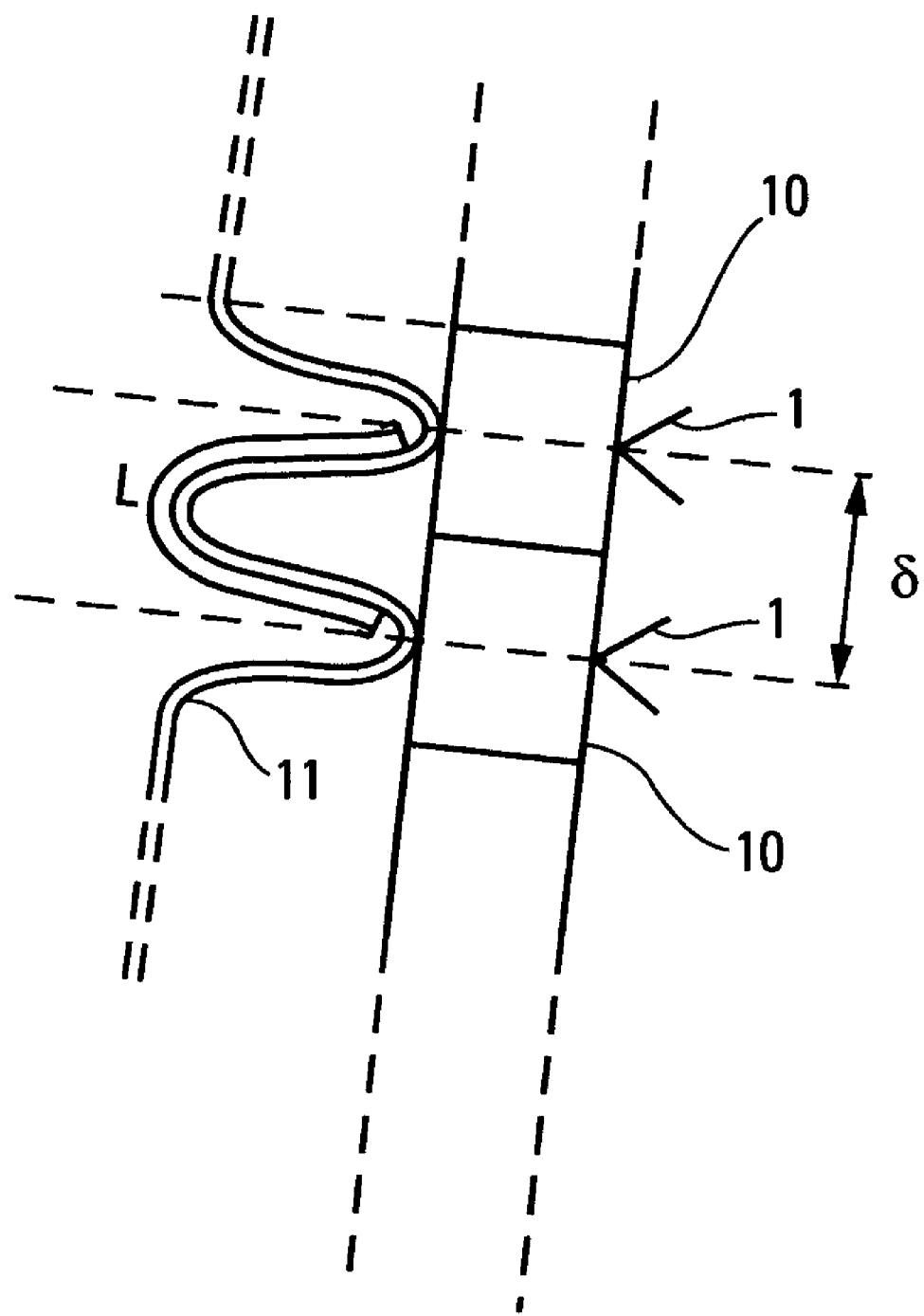
Figure 2D:
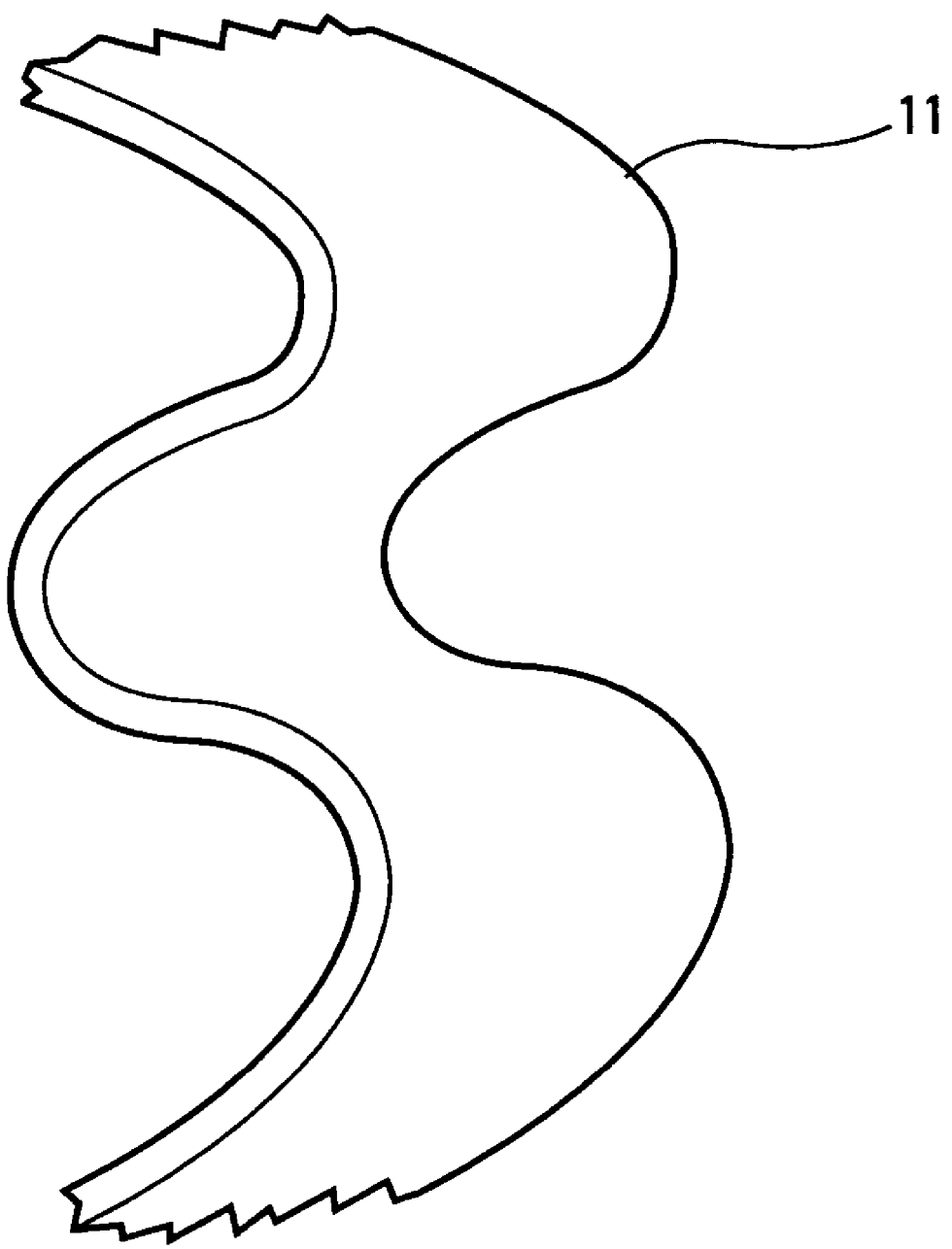
Figure 3:
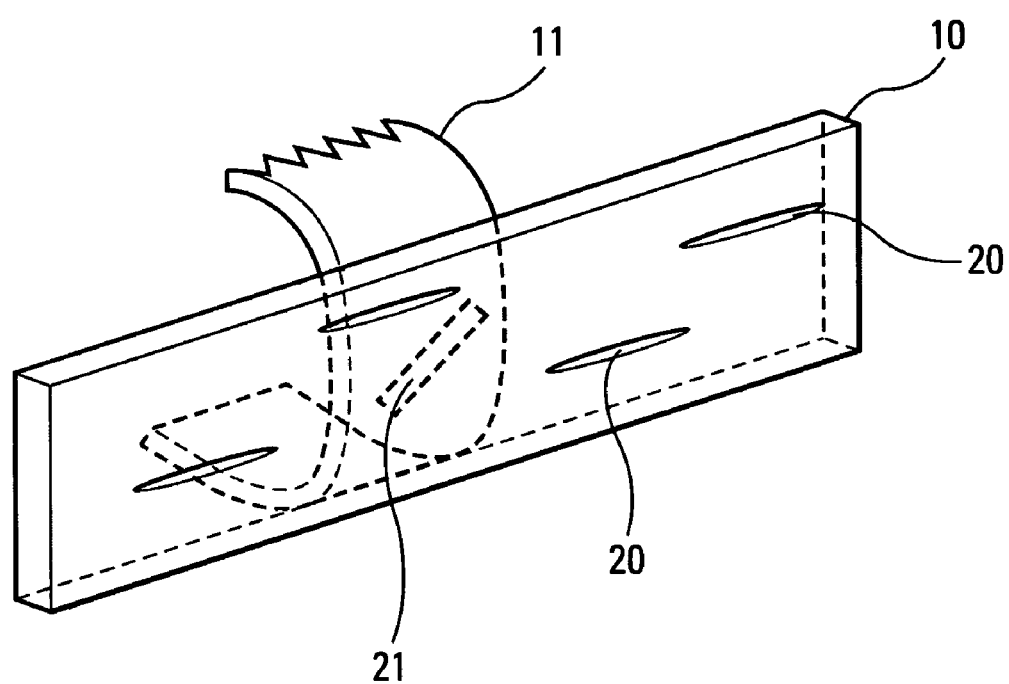

Other features and advantages of the invention will become apparent from the description that follows, given in light of the appended drawings which represent:

FIG. 1, a principle of electronic sweep implemented on a radar antenna;

FIG. 2a, an antenna seen from the front comprising in particular radiating waveguides on which are formed groups of slots;

FIG. 2b, the antenna of FIG. 2a seen in profile;

FIG. 2c, a detail of the antenna of FIG. 2b seen in profile;

FIG. 2d, a feed waveguide in the form of a coil;

FIG. 3, the detail of a radiating waveguide.

The description that follows is particularly based on the example of an airborne meteorological radar comprising an antenna producing an electronic elevation-mode sweep of its beam. However, the invention can be applied interchangeably to any antenna for which the sweep of its beam is controlled in at least one plane non-mechanically.

FIG. 1 illustrates a principle of electronic sweep implemented on a radar antenna. The electronic sweep of the beam formed by the radar antenna can be obtained by phase-shifting relative to each other the transmit and receive channels of a network comprising slots. FIG. 1 shows a radar antenna comprising slots 1 for receiving and sending microwave signals. These slots 1 are formed on a straight feed waveguide 2. The straight feed waveguide 2 is used to direct the electromagnetic waves generated and amplified upstream towards the set of slots 1. Conversely, the straight feed waveguide 2 is used to direct the electromagnetic waves received via the slots 1 towards the upstream devices provided in particular for amplifying, processing and interpreting the received signals. In FIG. 1, a centre line 3 is disposed perpendicularly to the plane containing the slots 1. This centre line 3 cuts the plane including the slots 1 at a point located in the middle of the network of slots 1. The antenna forms a beam 5 in the required elevation-mode pointing direction relative to the centre line 3 and denoted θ. In the same plane, there is represented an inclined plane 4 perpendicular to the pointing direction θ. This plane 4, called phase plane, represents the phase shift according to the vertical position of the slots 1 of the microwaves received or sent to produce a pointing in the required pointing direction θ. The above description illustrates the known principle of electronic elevation-mode sweep. The principle is the same for bearing-mode sweep.

It is therefore appropriate, to apply an electronic sweep, to modify the phase of the electromagnetic waves received or sent via the slots 1 according to their relative position and the wave plane 4 corresponding to the required pointing direction θ. By varying the wavelength of the electromagnetic waves travelling through the straight feed waveguide 2 in a given frequency band, it is thus possible to produce a wave plane 4 as illustrated in FIG. 1. The amplitude of these variations, and therefore the angular segment covered by the antenna in a given plane, is particularly dependent on the length of the straight feed waveguide 2 between the slots 1.

A wave travelling through the straight feed waveguide 2 has as its main characteristic a wavelength $\lambda_0$. Two adjacent slots 1 are spaced at a distance $\delta$, approximately 0.7 times the wavelength $\lambda_0$ for example. In the case of an antenna providing an elevation-mode sweep, the slots 1 can be disposed horizontally in rows, each row forming a group spaced at the distance $\delta$, approximately 0.7 times the wavelength $\lambda_0$ for example. The length L corresponds to the actual linear distance traveled by the electromagnetic wave in the straight feed waveguide 2 between two adjacent slots 1 or two adjacent groups of slots 1.

According to the electronic sweep principle, it is necessary to create a phase difference $\phi_n$ between the first slot 1, for example, and the nth, the antenna comprising on its surface n slots 1, numbered in the description from 1 to n. If the frequency of the electromagnetic wave travelling through the straight feed waveguide 2 is denoted f and $\lambda_g$ is the corresponding wavelength, the phase difference $\phi_n$ can be defined by the following formula:

$$\phi_n = 2\pi/\lambda_g \cdot n \cdot L.$$

From this formula, and from the amplitudes of the incident waves on the n slots by electromagnetic coupling, denoted $\{A_n\}$, it is possible to obtain an estimate of the transmit- and receive-mode gain G according to the pointing direction $\theta$, given by applying the formula $$G(\theta) = \sum_n A_n \cdot e^{j\left(\frac{2\pi}{\lambda} \cdot n \cdot \delta \cdot \sin(\theta) - \varphi_n\right)}.$$

This equation allows a maximum, corresponding to the radiation maximum, or main lobe in $\theta_0$, such that, if $\lambda$ is the length of the wave in vacuum at the frequency f considered and k is an even or odd integer number for bringing the sine between −1 and 1, $\sin(\theta_0) =$ $$\frac{\lambda}{\delta} \cdot \left(\frac{L}{\lambda_g} - \frac{k}{2}\right) \cdot k$$

can in particular be chosen by taking the integer value closest to $L/(\lambda_g/2)$, namely, for example, $$k = E\left(\frac{L}{\frac{\lambda_g}{2}} + \frac{1}{2}\right).$$

Since the ratio $\lambda/\lambda_g$ varies with the frequency, the pointing angle $\theta$ of the antenna can be varied by a few degrees by varying the frequency applied to the feed waveguide 2 from the network of slots 1. The greater the length L between two slots 1 or groups of slots 1, the greater the angular range available for a given frequency band.

The straight feed waveguide 2 has as its main characteristic a cut-off frequency $f_c$ of its fundamental mode. The frequency band $\Delta f$, in which the frequency of the wave guided in the straight feed waveguide 2 can evolve in order to modify the pointing direction $\theta$ of the antenna, has a centre frequency $f_0$. The wavelength in vacuum of the centre frequency $f_0$ is denoted $\lambda_0$. If the electromagnetic wave travelling through the straight feed waveguide 2 has a frequency equal to the centre frequency $f_0$, there is then obtained a pointing direction of the beam equal to $\theta_0$ relative to the mechanical axis of the antenna. The angular deviation $\Delta\theta$ in radians expressing the angular range available for a given frequency band can be evaluated by the formula:

$$\Delta\theta = \frac{1}{\delta \cdot \cos\theta_0}\left[L\frac{\left(\frac{\lambda_0}{\lambda_c}\right)^2}{\sqrt{1-\left(\frac{\lambda_0}{\lambda_c}\right)^2}} + \frac{k}{2}\cdot\lambda_0\right]\cdot\frac{\Delta f}{f_0}.$$

FIG. 2a shows an antenna according to the invention seen from the front. In the case of an antenna providing an elevation-mode sweep, the slots 1 can be disposed horizontally in rows, each row forming a group. The average distance between two adjacent groups, measured, for example, between the respective centres of gravity of the two groups, is roughly equal to the distance $\delta$, approximately 0.7 times the wavelength $\lambda_0$ for example. A group of slots 1 can, for example, be formed on a radiating waveguide 10. The radiating waveguide 10 can, for example, be a slotted waveguide. By electromagnetic coupling, a wave travelling through the radiating waveguide 10 is sent via the slots 1. Conversely, by electromagnetic coupling, the incident electromagnetic waves received via the slots 1 are transmitted to the radiating waveguide 10.

In an embodiment, the radiating waveguide 10 operates in resonant mode. For this, the radiating waveguide 10 is terminated by short circuits at each end.

The antenna presented in FIG. 2a has a number of adjacent radiating waveguides 10, arranged to form an antenna with a front that is roughly circular in shape. Also, the antenna could equally well comprise a different number of rows or even be of a totally different shape, such as, for example, rectangular.

FIG. 2b shows this same antenna in profile. The antenna mainly comprises a folded feed waveguide 11, in this case positioned vertically. Each radiating waveguide 10 is electromagnetically coupled at least one point with the feed waveguide 11. The feed waveguide 11 is positioned in the plane perpendicular to the plane containing the radiating waveguides 10. This arrangement makes it possible in particular to produce a coupling by slots between the feed waveguide 11 and the radiating waveguides 10. Furthermore, this arrangement presents the advantage of making the antenna compact in terms of footprint occupied by the feed waveguide 11.

In an embodiment, the feed waveguide 10 operates in progressive mode. For this, an appropriate load 12 is positioned at one end of the feed waveguide 11. In practice, the wave feeding the guide is not then reflected by the end of the feed waveguide 11.

FIG. 2c shows this same antenna, seen in profile, in greater detail. On each radiating waveguide 10, slots 1 are formed in groups. The distance between two groups of slots 1 disposed on two adjacent radiating waveguides 10 is equal to a distance $\delta$. The feed waveguide 11 has a length L between these two same groups of slots 1. In an embodiment of the antenna according to the invention, this length L is greater than δ, using, for example, a coil shape in order for the length L to be greater than the vertical spacing directly available if the feed waveguide 11 had a straight shape. In practice, by way of example, for an antenna with a vertical distance δ between two groups of slots 1 equal to 25 mm and for which the beam needs to be able to sweep in elevation the area between −3 degrees and 3 degrees relative to the horizon, the length L of the feed waveguide 11 between these two groups of slots 1 must be at least 157 mm. By folding the feed waveguide 11, it becomes possible to have a sufficient length L.

FIG. 2d shows a feed waveguide 11 in coil shape. A flat folded waveguide can in particular be used to produce the feed waveguide 11 in coil shape. The thickness of the feed waveguide 11 can also be reduced in order to facilitate the mechanical implementation of the feed waveguide 11 in coil shape.

FIG. 3 shows the detail of a radiating waveguide 10. A coupling slot 21 is cut into the rear of the radiating waveguide 10. This coupling slot 21 is positioned roughly in the middle of the rear of the radiating waveguide 10 in order for the contribution of each slot 1 to the formation of a wave in the radiating waveguide 10 to be equivalent. The angle of the coupling slot 21 relative to the radiating waveguide 10 is determined by the required electromagnetic coupling characteristics. Also, the slot can be positioned so as not to be parallel to the length of the side in which it is formed, as a way of optimizing the electromagnetic coupling between the waveguides. The coupling slot can, for example, be angled relative to the length of the side in which it is formed by an angle close to 45°. In other applications, it could be desirable to arrange this coupling slot 21 differently. A similar slot disposed on the feed waveguide 11 is merged with the coupling slot 21. Radiating slots 20 are formed on the front of the radiating waveguide 10. The radiating slots 20 are used mainly to distribute by electromagnetic coupling a portion of the wave corresponding to the radar microwave signal at the slots 1. A number of coupling slots 21 could, for example, be formed if a number of feed waveguides 11 were used.

In the case of a radar working in the X band, the radiating waveguides 10 can, for example, be flat slotted waveguides with outer dimensions of approximately 23 mm for the long side and between 5 mm and 10 mm internal dimension for the small side, the length being determined by the number of slots 1. The thickness has no influence on the dimensioning parameters of the antenna. With the width of the feed waveguide 11 being 23 mm and the vertical length L of the feed waveguide 11 between two groups of slots 1 being 157 mm, the sweep obtained by varying the frequency f of the wave guided in the feed waveguide 11 over a band of 100 MHz is then between −3 degrees and 3 degrees. The structure of the secondary lobes of the elevation-mode antenna pattern is not altered by varying the pointing of the beam according to the frequency.

The invention claimed is:

1. An antenna comprising:
radiating waveguides on which are formed slots, wherein at least one feed waveguide is linked by coupling slots to the radiating waveguides, the variation of the pointing direction of the beam from the antenna in at least one plane being obtained by varying the frequency of the wave guided by the feed waveguide, the length of the feed waveguide between the coupling slots of two adjacent radiating waveguides being greater than the distance separating the coupling slots of these two adjacent radiating waveguides.

2. The antenna according to claim 1, wherein the feed waveguide is positioned roughly in a plane perpendicular to the radiating waveguides.

3. The antenna according to claim 1, wherein the feed waveguide is in the form of a coil.

4. The antenna according to claim 1, wherein the feed waveguide operates in progressive mode.

5. The antenna according to claim 1, wherein the radiating waveguides operate in resonant mode.

6. The antenna according to claim 1, wherein the radiating waveguide includes a coupling slot not parallel to the length of the side in which the coupling slot is formed.

7. The antenna according to claim 1, wherein it is used in a radar suited to the detection and locating of meteorological phenomena.

* * * * *